United States Patent [19]

Pepelanov

[11] Patent Number: 5,865,105
[45] Date of Patent: Feb. 2, 1999

[54] CUTTING BOARD TRAY

[76] Inventor: George Pepelanov, 2329 E. Commonwealth Ave., #20, Fullerton, Calif. 92631

[21] Appl. No.: 928,845

[22] Filed: Sep. 12, 1997

Related U.S. Application Data

[63] Continuation-in-part of Ser. No. 722,747, Oct. 1, 1996, abandoned.

[51] Int. Cl.[6] ................................................. B23Q 3/00
[52] U.S. Cl. ........................... 99/446; 99/449; 99/646 R; 269/289 R; 269/15
[58] Field of Search .............................. 99/425, 422, 446, 99/449, 646 R, 483; 269/289 R, 302.1, 15, 13

[56] References Cited

U.S. PATENT DOCUMENTS

| | | | |
|---|---|---|---|
| 693,627 | 2/1902 | Sharp | 269/15 |
| 2,609,024 | 9/1952 | Russ | 269/15 |
| 5,382,009 | 1/1995 | Mertz et al. | 269/16 |

Primary Examiner—Reginald L. Alexander
Attorney, Agent, or Firm—Roy A. Ekstrand

[57] ABSTRACT

A generally planar rectangular base plate supports a quartet of upwardly extending outwardly angled support members each terminating in a receptacle end. The receptacle ends receive and support a rectangular generally planar cutting board at the four corners thereof. A plurality of openings are formed between the base plate and the upwardly extending support members through which a generally rectangular working pan having a bottom, opposed sides, frontal wall and rear wall is slidingly received through any of the openings to rest upon the base plate beneath the cutting board. The working pan may be partially withdrawn from the cutting board tray thus formed to extend partially beyond the overlying edge of the cutting board to facilitate the transfer of discarded materials from the cutting board to the working pan.

16 Claims, 3 Drawing Sheets

CUTTING BOARD TRAY

CROSS-REFERENCE TO RELATED APPLICATION

This application is a continuation in part of a application Ser. No. 08/722,747 filed Oct. 1, 1996, now abandoned, on behalf of George Pepelanov and entitled CUTTING BOARD TRAY which is incorporated herein by reference.

FIELD OF THE INVENTION

The present invention relates generally to restaurant and other institutional food preparation apparatus and particularly to apparatus for holding and supporting a cutting board in combination with a working pan.

BACKGROUND OF THE INVENTION

The invention herein relates to food preparation and management apparatuses and more specifically where slicing or cutting of the food is required. The present most common devices employed in kitchens at home, restaurants and other food management places are knife, cutting board, and a pan to collect the prepared food. Since the conventional height of the tables and counters used in kitchens is around 36", this becomes low and inconvenient working surface for a prep cook taller than approximately 5' 8". In order for the cook to prepare the food he/she needs to lean over the cutting board and arch his/her back extensively for long periods of time. This leads to workers compensation claims, back injuries, and other work related health complications.

In another aspect the size of the cutting board determines the working space for each prep cook. In addition a working pan approximately the size of the cutting board is usually placed within reach on the side of the cutting board. Since the working surface in many kitchens is limited, the space consumption of this form of setting is highly inefficient. In addition the collection of the already cut food particles involves scooping the food particles with hands, lifting them, and carrying them to the working pan, which is inconvenient, less hygienically feasible, and allows for spillage of the food. This procedure also becomes unsafe where instead of two hands is used one hand and a knife. In this case the prep cook does not leave the knife, but is using it to sweep the food particles in a bunch and then scoop them by opposing the knife with his other hand. Cuts happen very often on the hand opposing the knife.

SUMMARY OF THE INVENTION

The invention relates to apparatus for use in kitchens in the preparation of foods, and it includes a tray designed to securely hold a cutting board horizontal on a predetermined height above a working table. The said tray includes a rectangular base plate and a plurality of support members projecting upward and slightly outward forming a tapered opening towards the top. This outward tapering of the support members would allow stacking of the tray into one another when not in use. The length of the legs determining the height at which the cutting board is held above the table. At the top end of each support member a receptacle end is constructed to accept each corner of the cutting board so as to securely hold the cutting board in place. Additional L shaped sections are attached at the top side in between said support members for the purposes of stability.

Thus, in accordance with the present invention, there is provided a cutting board tray for use in combination with a generally rectangular cutting board and a generally rectangular working tray, the cutting board tray comprising: a generally planar rectangular base plate; a plurality of support members each having a lower end joined to a corner of the rectangular base plate and an upper end; a plurality of open corner receptacle ends formed on each of the upper ends; and a plurality of elongated sections extending between the receptacle ends; the elongated sections and the receptacle ends being constructed to receive and support a generally rectangular cutting board spaced above the base plate, the support members and the elongated sections defining openings through which a working tray may be inserted fully or partially beneath a cutting board supported by elongated sections and the receptacle ends.

In light of the foregoing, it is an object of an aspect of the instant invention to provide a cutting board tray which would allow for the horizontal elevation of a cutting board.

An additional object of this invention is to provide means for securely supporting the cutting board.

Still a further object of the present invention is to provide means for securing the said tray onto the working table.

In another aspect the present invention is constructed to allow stacking of the said trays into on another, when not in operation, in order to minimize storage space.

Still a further object of an aspect of this invention is to provide, if desired, with a considerable height of elevation so as to allow a conventional working pan, used for the collection of prepared foods, to be stored underneath the cutting board.

It is a further object of this aspect of the invention to allow for the working pan to be pulled or pushed out from underneath the cutting board, toward any one of the four sides of the cutting board, for the purposes of convenient and easy transfer of the cut food particles from the cutting board into the working pan therebelow.

Yet a further object of this invention is to provide a cutting board tray which is reliable and durable in operation while being constructed utilizing state-of-the-art techniques and components.

These, and additional objects, advantages, features, and benefits of the present invention will become apparent from the following specification.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
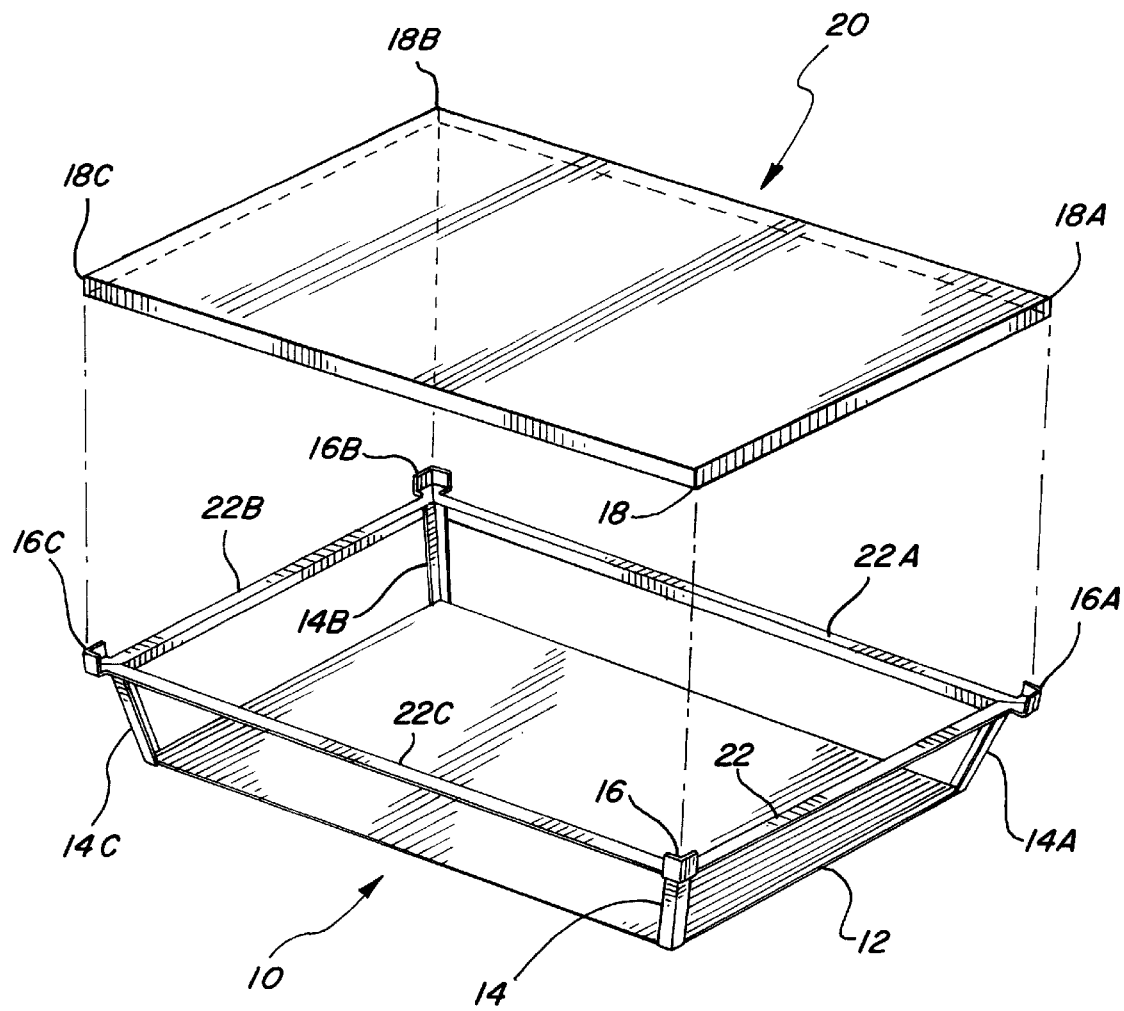
FIG. 1 is a perspective view of the cutting board tray according to the present invention. It also includes an exploded view of the cutting board tray and the cutting board assembly.

Referring now to the drawings of FIG. 1, we can see a conventional size cutting board generally designated by the numeral 20, and a cutting board tray made in accordance with the invention is designated generally by the numeral 10. It will be understood as this description proceeds that the components of the cutting board tray 10 may be of high impact plastic, sheet metal, or the like. The material for construction of the elements of the unit 10 need only be dictated by the consideration of wear, durability, and corrosion. In any event the cutting board tray 10 includes a base plate 12 which is generally of rectangular sheet material. Usually the thickness of base plate 12 is between 50 to 100 thousands of an inch and has a size less than the size of cutting board 20, but large enough to accommodate a conventional size working pan used to collect the already cut food particles. The underside of base plate 12 can be knurled in order to maximize friction with a rubber mat, wet towel, or the like, used by prep cooks to stabilize a cutting board onto a working table or counter. The cutting board tray 10 also includes four support members 14, 14A, 14B, and 14C. The length of the support members 14, 14A, 14B, and 14C can vary but is desired to be sufficient to accommodate 2" or 4" conventional working pan used in kitchens to collect prepared food particles. The bottom side of support members 14, 14A, 14B, and 14C are attached to the four corners of base plate 12 and project upward and slightly outward from base plate 12, forming a tapered opening towards the top. This outward tapering of the support members 14, 14A, 14B, and 14C would allow stacking of unit 10 into one another when not in use. At the top end of each support member 14, 14A, 14B, and 14C a receptacle end can be formed or attached there to, and has the general shape but is not limited to three relatively small plates perpendicular to each other so as to be able to accept the comer of a parallelepiped. The receptacle ends are designated generally by the numerals 16, 16A, 16B, and 16C. The receptacle ends 16, 16A, 16B, and 16C are dimensionally oriented to each accept the corresponding one of the four bottom corners 18, 18A, 18B, and 18C of the cutting board 20. To provide for additional strength of the unit 10 four angle iron or L shaped sections 22, 22A, 22B, and 22C are attached in between support members parallel and with proportional lengths to the sides of base plate 12. The profile of the angle iron or the L shaped sections does not need to be 90°. As shown on FIG. 1, L shaped section 22 is attached to support members 14 and 14A, L shaped section 22A is attached to support members 14A and 14B, L shaped section 22B is attached to support members 14B and 14C, L shaped section 22C is attached to support members 14C and 14. The L shaped sections are attached at the top side of the support members right below the receptacle ends, and are oriented so that one side of the profile of the L shaped section follows along the support member and the other side projects horizontally outwards. This form of orientation will not interfere with the stacking of unit 10, and would allow for the cutting board 20 to lay on one of the sides of the L shaped sections.

Unit 10 can also be molded, shaped, etc., without the need of separate parts to be assembled.

In operation unit 10 is intended to be placed on a table, counter, or other commonly used working surfaces, and a cutting board 20 is placed on unit 10 as described thereinabove. The space provided underneath the cutting board can be utilized by placing a working pan for the collection of the already cut food particles. The working pan can be pulled out from underneath from any side of the cutting board. Thus if the pan is not away from the cutting board the food particles can be swept off any side of the cutting board into the pan therebelow.

Figure 2:
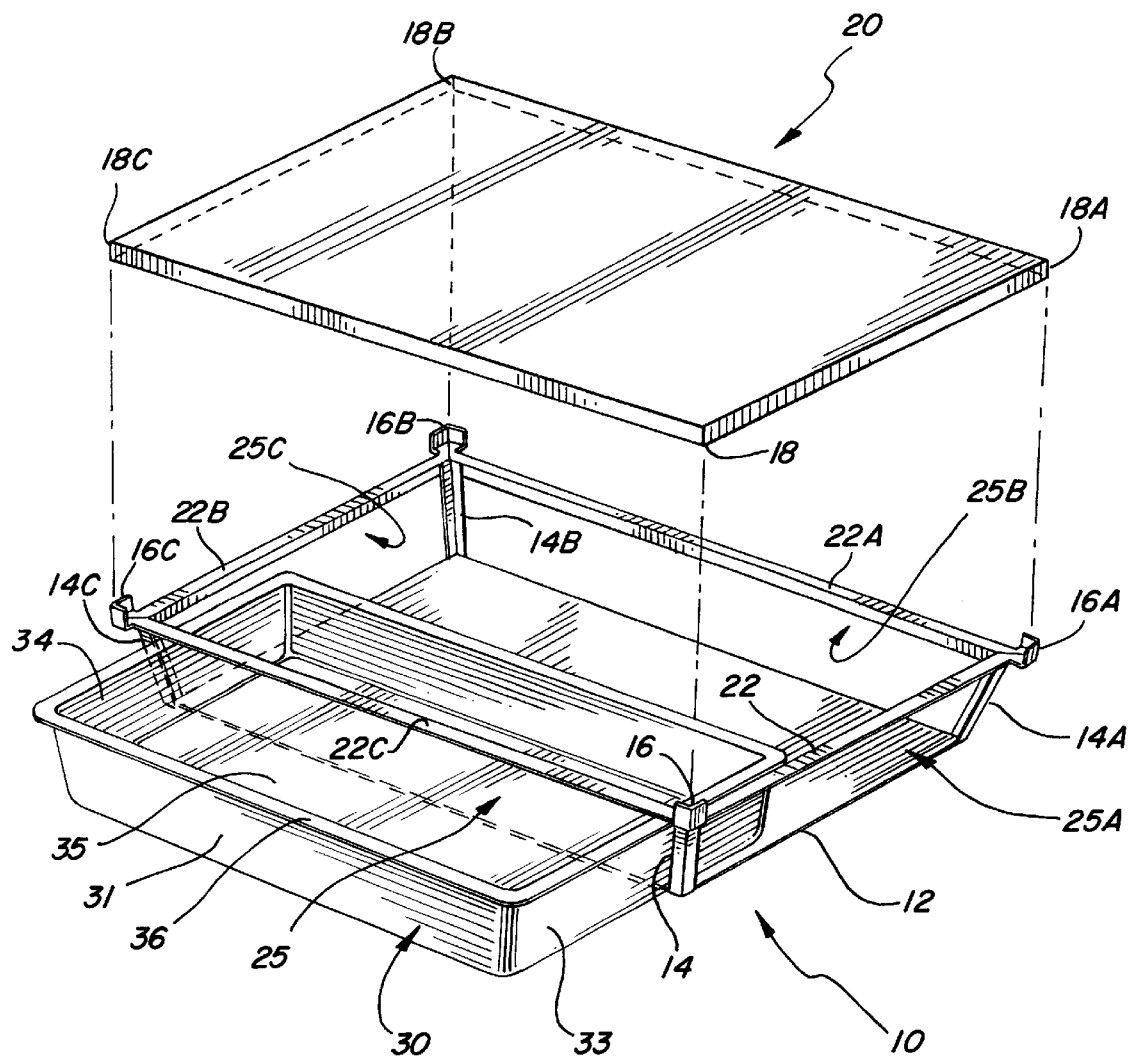
FIG. 2 sets forth a perspective assembly view of the present invention cutting board tray utilizing a conventional working pan.

FIG. 2 sets forth a perspective assembly view of the cutting board tray of the present invention generally referenced by numeral 10 used in combination with a conventional working pan generally referenced by numeral 30. As described above, cutting board tray 10 includes a base plate 12 having a plurality of upwardly and outwardly extending support members 14, 14A, 14B and 14C attached to the corners thereof. Support members 14 through 14C further define receptacle end portions 16, 16A, 16B and 16C at the upper ends thereof. Receptacle ends 16 through 16C are joined by a plurality of L-shaped sections 22, 22A, 22B and 22C to form an upper edge portion for cutting board tray 10. More specifically, L-shaped section 22 extends between receptacle ends 16 and 16A while L-shaped section 22A extends between receptacle ends 16A and 16B. Similarly, L-shaped section 22B extends between receptacle ends 16B and 16C while L-shaped section 22C extends between receptacle ends 16C and 16.

In accordance with an important aspect of the present invention, receptacle ends 16 through 16C are configured to receive and support a conventional rectangular cutting board generally referenced by numeral 20. Cutting board 20 is generally planar and rectangular and defines corner portions 18, 18A, 18B and 18C. Cutting board tray 10 is sized with respect to cutting board 20 to permit corners 18 through 18C to be received within receptacle ends 16 through 16C respectively. This nesting attachment facilitates the removable support of cutting board tray in a nesting fashion.

In accordance with an important aspect of the present invention, cutting board tray 10 defines a frontal opening 25 formed between base plate 12 and L-shaped section 22C as well as support members 14C and 14. In further accordance with the present invention, frontal opening 25 is of sufficient size with respect to a conventional working pan 30 to facilitate the insertion of working pan 30 onto base plate 12 through frontal opening 25 in a sliding drawer-like support. For purposes of illustration, working pan 30 is shown positioned partially inserted into cutting board tray 10. In further accordance with the present invention, cutting board tray 10 forms a pair of side openings 25A and 25C correspondingly sized with respect to working pan 30 to facilitate the sliding insertion or removal of working pan 30 therethrough in a similar fashion to that illustrated for frontal opening 25. Finally, cutting board tray 10 defines a rear opening 25B identical to frontal opening 25 which further facilitates the sliding insertion and removal of working pan 30 upon base plate 10.

Working pan 30 is conventional in fabrication and defines a bottom surface 35, opposed side surfaces 33 and 34, a front surface 31 and a rear surface 32. A top edge 36 extends about the upper portion of sides 33 and 34, front 31 and rear 32. As can be seen, working pan 30 is able to be fully inserted into cutting board tray 10 through any of the openings defined therein such that working pan 30 is then positioned upon base plate 12 beneath cutting board 20. In further accordance with the present invention, working pan 30 facilitates the convenient transfer of cut food materials from cutting board 20 to the working pan by simply positioning working pan 30 in a partially withdrawn position as shown in FIG. 2. With pan 30 thus positioned, cut food articles upon cutting board 20 are simply swept over the edge of the cutting board to fall into working pan 30.

Figure 3:
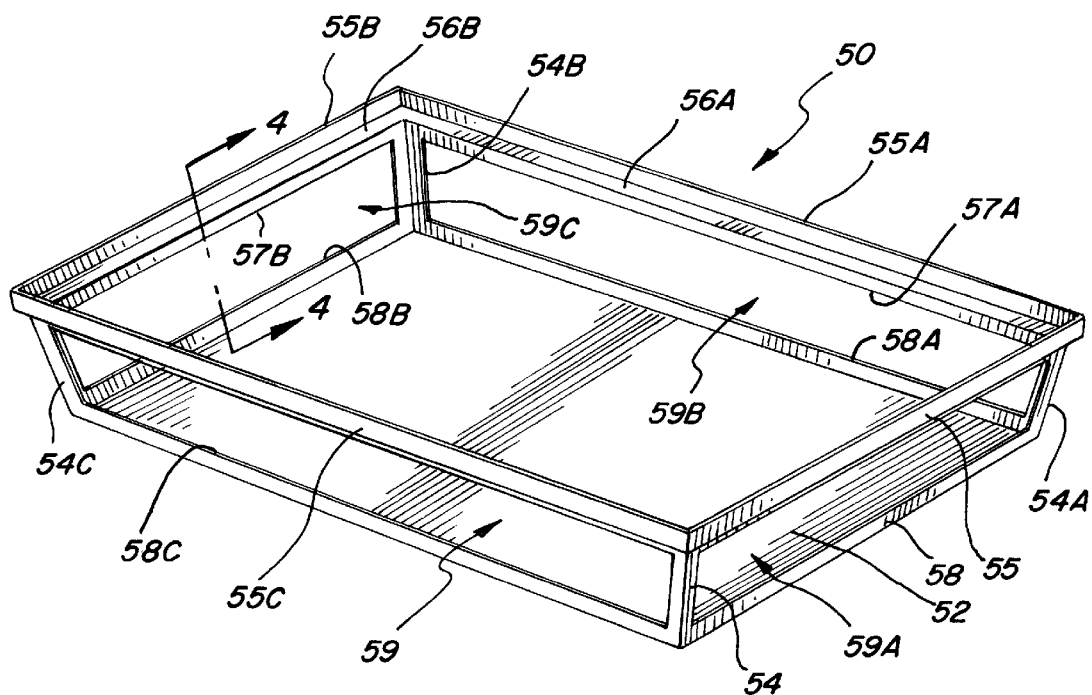
FIG. 3 sets forth a perspective view of an alternate embodiment of the present invention cutting board tray.
Figure 4:
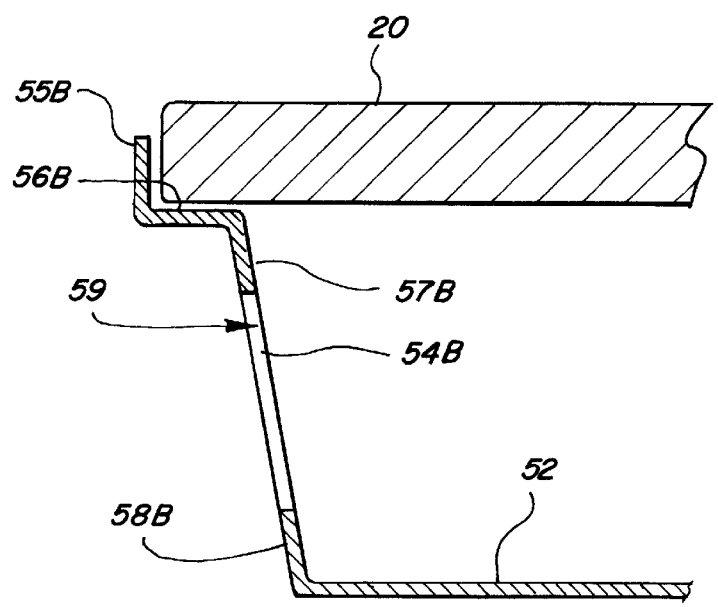
FIG. 4 sets forth a section view of the embodiment of FIG. 3 taken along section lines 4—4 therein.

FIG. 3 sets forth a perspective view of an alternate embodiment of the present invention cutting board tray generally referenced by numeral 50. Cutting board tray 50 functions in substantially the same manner as cutting board tray 10 shown in FIGS. 1 and 2 in that it receives and supports a conventional working pan such as working pan 30 shown in FIG. 2. By way of further correspondence to cutting board tray 10, cutting board tray 50 also supports a conventional, generally rectangular cutting board such as cutting board 20 shown in FIG. 2. Thus, in accordance with this general similarity, cutting board tray 50 includes a generally rectangular planar base plate 52 supporting a plurality of upwardly and outwardly extending support members 54, 54A, 54B and 54C at the corners thereof. Cutting board tray 50 differs from cutting board tray 10 in that a different embodiment is utilized for supporting cutting board 20. Thus, for purposes of comparison, it will be noted that the means for supporting cutting board 20 in the embodiment of FIGS. 1 and 2 comprises L-shaped sections and corner receptacle ends. In contrast, the cutting board support means of cutting board tray 50 comprises a rectangular board surface formed by board surfaces 56, 56A, 56B and 56C extending between the upper ends of support members 54, 54A, 54B and 54C. Thus, as is seen in FIG. 4, cutting board 20 rests upon the combination of cutting board surfaces 56 through 56C. The cutting board support means of cutting board tray 50 further includes an encircling or enclosing outer wall 55, 55A, 55B and 55C. As is also better seen in FIG. 4, the respective outer wall portions are generally perpendicular to the associated board surfaces which they enclose. The combination of board surface and outer wall receives the generally rectangular cutting board such as cutting board 20 shown in FIG. 2.

Cutting board tray 50 further includes a plurality of downwardly extending upper reinforcements 57, 57A, 57B and 57C which extend downwardly from the inner edges of their respective associated board surfaces to strengthen the support for cutting board 20. To further strengthen cutting board tray 50, a plurality of lower reinforcements 58, 58A, 58B and 58C extend upwardly from base plate 52 and span the distances between the adjacent support members on either side.

The combined structure of cutting board tray 50 defines frontal opening 59, side openings 59A and 59C, and rear opening 59B in substantially the same manner as openings 25 through 25C of cutting board tray 10 (seen in FIG. 2). Thus, cutting board tray 50 is able to receive a conventional working pan such as working pan 30 shown in FIG. 2 in the same manner as described above for cutting board tray 10. In addition and in further similarity to cutting board tray 10 described above, cutting board tray 50 is configured to provide nested storage as a plurality of cutting board trays similarly fabricated may be stacked within other board trays in a nested configuration.

FIG. 4 sets forth a partial section view of cutting board tray 50 taken along section lines 4—4 in FIG. 3. As described above, cutting board tray 50 includes a base plate 52 supporting upwardly extending support members such as support member 54B. A cutting board support means is provided by a board surface portion 56B and an outer wall 55B extending upwardly therefrom. A portion of cutting board 20 is shown positioned above board surface portion 56B to indicate the support of cutting board 20. An upper reinforcement 57B extends downwardly from the inner edge of board surface 56B and is generally aligned with support member 54B. For further reinforcement, a lower reinforcement 58B extends upwardly from base plate 52 and is also preferably generally aligned with support member 54B. A side opening 59B is formed between upper reinforcement 57B and lower reinforcement 58B and support members 54B and 54C (the latter seen in FIG. 3).

It is believed that the operation and construction of the above described invention will be apparent from the foregoing description. While the cutting board tray and the constructional embodiments shown and described have been characterized as being preferred, it will be obvious that various changes and modifications may be maid without departing from the spirit and scope of the invention as defined in the following claims.

I claim:

1. A cutting board tray for use in combination with a generally rectangular cutting board and a generally rectangular working tray, said cutting board tray comprising:

a generally planar rectangular base plate;

a plurality of support members each having a lower end joined to a corner of said rectangular base plate and an upper end;

a plurality of elongated sections extending between said upper ends of said support members; and a cutting board support supported by said upper ends of said support members, said elongated sections and said cutting board support being constructed to receive and support a generally rectangular cutting board spaced above said base plate, said support members, said base plate and said elongated sections defining openings through which a working tray may be inserted fully or partially beneath a cutting board supported by elongated sections and said cutting board support.

2. The cutting board tray set forth in claim 1 wherein said cutting board support includes a plurality of corner receptacle ends formed on each of said upper ends of said support members.

3. The cutting board tray set forth in claim 2 wherein said receptacle ends, said base plate, said elongated sections and said support members are configured to receive an identical cutting board tray in a nested arrangement.

4. The cutting board tray set forth in claim 3 wherein said openings defined in said cutting board tray include a frontal opening.

5. The cutting board tray set forth in claim 4 wherein said receptacle ends each define interior three-side corners.

6. The cutting board tray set forth in claim 5 wherein said support members each extend outwardly and upwardly from said base plate.

7. The cutting board tray set forth in claim 1 wherein said support members each extend outwardly and upwardly from said base plate.

8. The cutting board tray set forth in claim 1 wherein said receptacle ends each define interior three-side corners.

9. The cutting board tray set forth in claim 1 wherein said openings include a front opening, and at least one side opening.

10. The cutting board tray set forth in claim 1 wherein said openings include a front opening, a pair of opposed side openings and a rear opening.

11. The cutting board tray set forth in claim 1 wherein said cutting board support includes a board surface joined to said upper ends and extending therebetween and an outer wall generally perpendicular to and enclosing said board surface.

12. The cutting board tray set forth in claim 11 further including a plurality of upper reinforcements extending from the inner edge of said board surface between each of said support members.

13. The cutting board tray set forth in claim 12 further including a lower reinforcement extending upwardly from said base plate.

14. The cutting board tray set forth in claim 13 wherein said openings defined in said cutting board tray include a frontal opening.

15. The cutting board tray set forth in claim 14 wherein said support members each extend outwardly and upwardly from said base plate.

16. The cutting board tray set forth in claim 15 wherein said openings include a front opening, and at least one side opening.

* * * * *